Figure 4:
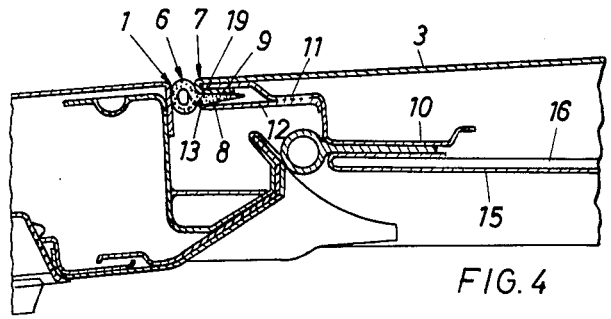

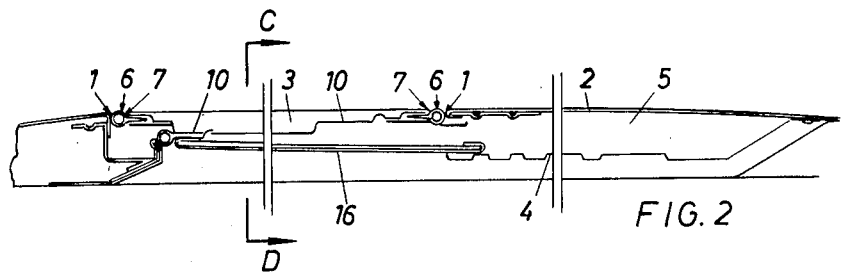
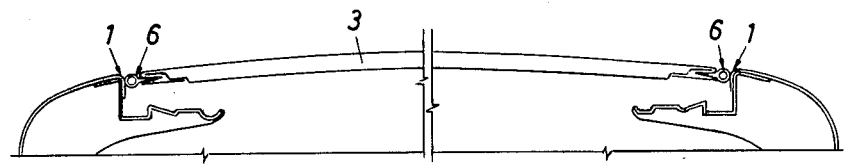
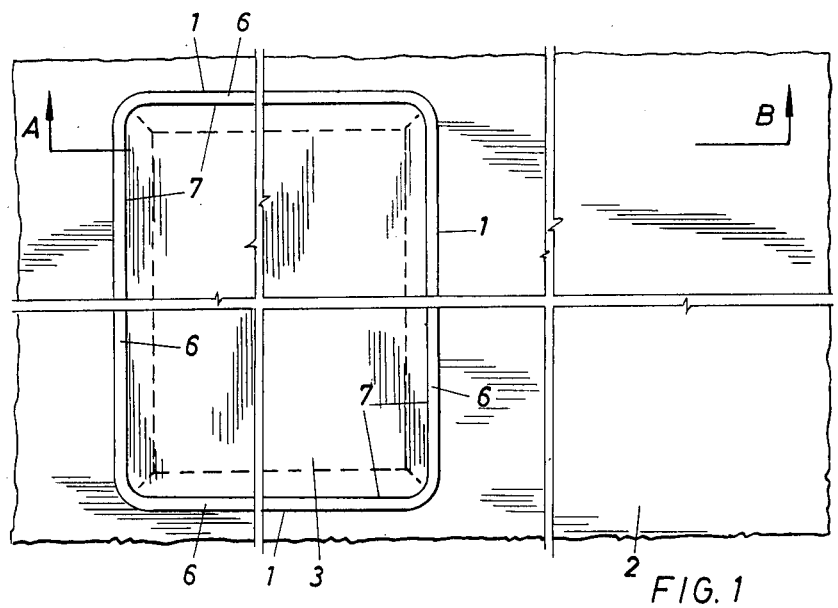

July 19, 1966 G. HERR ET AL 3,261,133
SLIDING ROOF ARRANGEMENT
Filed Feb. 5, 1963 2 Sheets-Sheet 2

INVENTORS:
GERHARD HERR
KURT CZIPTSCHIRSCH
BY: Robert R. Youtie
ATTORNEY

United States Patent Office 3,261,133
Patented July 19, 1966

3,261,133
SLIDING ROOF ARRANGEMENT
Gerhard Herr, Wuppertal-Vohwinkel, and Kurt Cziptschirsch, Wuppertal-Elberfeld, Germany, assignors to Gebr. Happich G.m.b.H., Wuppertal-Elberfeld, Germany, a company of Germany
Filed Feb. 5, 1963, Ser. No. 257,052
3 Claims. (Cl. 52—19)

The present invention relates to a sliding roof arrangement, particularly for motor cars, having a rigid sliding roof panel capable of being pushed rearwardly under the fixed roof structure for clearing a sunshine aperture therein.

It is known in sliding roof arrangements of this kind to make the sliding roof panel enter in the closed position from underneath into said sunshine aperture with the interposition of a sealing strip so as to seal the gap between the fixed roof structure and the sliding roof panel. The attachment of the sealing strip takes places in various ways; as a rule the strips are attached by cementing them to the fixed roof structure, or in sections of the strip corresponding to the lengths of the edges of the perimeter of said sliding roof panel.

However, considerable difficulties arise from the insufficient durability of the attachment or by the seating of the sliding roof panel varying in the course of use, some parts of the sealing components protruding in an unsightly manner beyond the roof surface, or even more frequently, said sealing components receding and thereby forming water troughs, where penetration of moisture may occur.

Moreover, cementing requires considerable sticking on areas, so that the structural height of the margins of the sliding roof panel has to be dimensioned lavishly and the clear internal height of the superstructure of the automobile is correspondingly reduced. Cemented connections require also considerable time for fitting.

The invention has the primary object of providing a sliding roof construction, which allows a simple and advantageous construction of the seal of the sliding roof panel, and a favorable structural formation of a sliding roof panel having a low structural height as well as a lasting, accurate seating of the sealing means.

With these and other objects in view we provide a sliding roof arrangement for automobiles, comprising in combination: a fixed roof structure with a sunshine aperture in it, a rigid sliding roof panel mounted on said fixed roof structure slidably in the fore-and-aft direction and capable of being lowered below and to be pushed under said fixed roof structure in the aft position clearing said sunshine aperture, said sliding roof panel having a downwardly turned up edge, and a sealing strip profile running all along the outer perimeter of said sliding roof panel so as to seal the gap between the latter and the inner perimeter of said sunshine opening in the closed position of said sliding roof panel said sealing strip profile having a convergent attachment flange clamped in below said downwardly turned up edge of said sliding roof panel.

Thereby primarily a safe, easily fitted and very accurately seated attachment of the sealing strip is attained. The latter may be formed of a single strip section which is inserted into a clamping slot all around. The bead of the sealing strip is advantageously supported by the margin of the sliding roof panel, and for this purpose a downward turn-up of this margin suffices which lies substantially in the plane of the roof surface, a stiffening frame being connected with said sliding frame being connected with said sliding roof panel at this turn-up. Hence a very stiff margin of the sliding roof panel, of low structural height results, whereby considerable advantages are attained from the structural and sealing points of view.

A structurally simple formation of the clamping slot is readily attainable, according to the present invention thereby that the stiffening frame held by the downward turn-up of the sliding roof panel on the underside thereof forms an intermediate step underneath of which a clamping ledge is attached which together with said downward turn-up of the sliding roof panel forms an entrance groove for the attachment flange of the sealing strip profile.

With advantage, on the aft end of the sliding roof panel a safeguard against damp spots caused by drop formation can be attained thereby that according to the invention the clamping ledge of said sliding roof panel is continued as a rain gutter at the aft end thereof. This gutter can drain off any dripping water down into the usual lateral drain channels.

The sealing profile used as a sealing strip may be constructed according to the invention advantageously in such a manner that the attachment flange of the sealing profile comprises two halves, which in the unloaded condition extend in diametrically opposite directions, and are folded into contact with one another by pre-loading preparatory to being clamped to the sliding roof panel.

When using readily weldable or cementable materials, particularly synthetic substances, a simpler construction of the entrance groove for the attachment flange of the sealing strip profile is attainable according to the invention without conspicuously visible marks, thereby that the plate of the sliding roof panel and the stiffening frame thereof have two oppositely directed turn-up bounding between them the insertion gap for said attachment flange, which is preferably longitudinally grooved.

Figure 8:
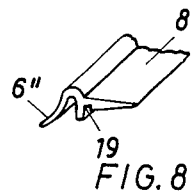
Figure 5:
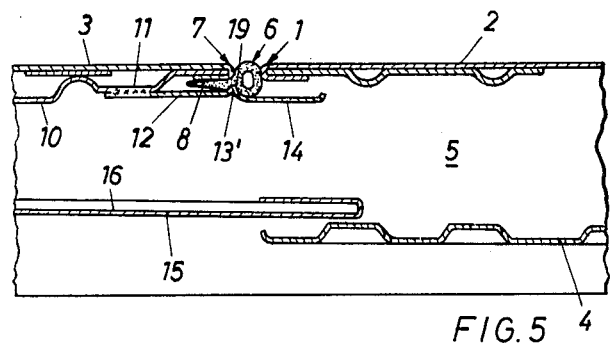
Figure 9:
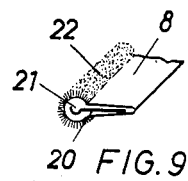
Figure 10:
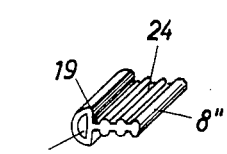
Figure 6:
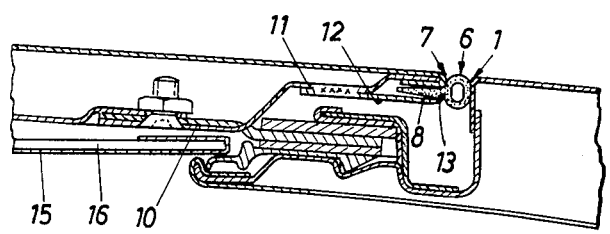
Figure 11:
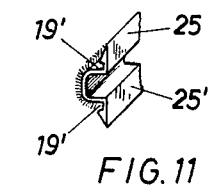
Figure 7:
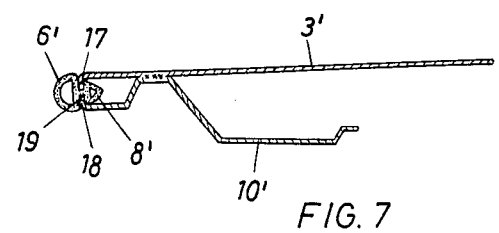
Figure 12:
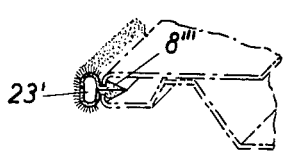

These and other features of our said invention will be clearly understood from the following description of a preferred embodiment and some modifications thereof, given by way of example with reference to the accompanying drawings, in which:

FIG. 1 is a plan view of the roof structure of an automobile provided with a sliding roof panel, FIG. 2 is a longitudinal section on the line A–B of FIG. 1, FIG. 3 is a transverse section on the line C–D of FIG. 2 on a larger scale, FIG. 4 is a vertical section of the forward sealing margin of the sliding roof in the closed position, on a larger scale still, FIG. 5 is a vertical section of the rear sealing margin of the sliding roof, FIG. 6 is a vertical section of a lateral sealing margin, FIG. 7 shows a modification of the insertion gap for the attachment flange of the sealing strip profile, FIGS. 8, 9 and 10 show in perspective sections some modifications of the sealing strip profile, FIG. 11 shows in perspective section a sealing strip profile with two flange portions capable of being folded towards one another, in a flat position, FIG. 12 shows the same clamped in a folded position.

The roof structure 2 of a car body provided with a sunshine aperture 1 consists in a sheet metal plate forming the roof skin, below which a trough 5 is provided which is formed by a blind bottom 4 underneath the rear portion of said roof structure, a rigid sliding roof panel 3 being pushed back into said trough when opening the sunshine aperture 1. This sliding roof panel lies in the closed gaps of the sunshine aperture 1, with a sealing strip 6 interposed.

The sealing strip 6, which preferably has a hollow profile (see FIGS. 2, 4, 5 and 6) runs all around the edge 7 of the sliding roof panel and has a converging attachment flange 8, which is clamped into an entrance groove below a downward turn up 9 of the sliding roof panel 3.

A lower stiffening frame 10 held by the turn up 9 of the sliding roof panel 3 forms an intermediate step 11. Underneath this intermediate step 11 a clamping ledge 12 is fixed, e.g. by spot-welding. This clamping ledge 12 is provided with slots facilitating fitting at the corners, and delimits with the turn up 9 the aforesaid entrance groove for the attachment flange 8 of the sealing strip profile. Owing to its construction the ledge 12 has a certain resilient yieldability, while the edge 7 of the sliding roof panel is reinforced by the turn up 9 and the interposed stiffening frame 10. Moreover the free forward margin of the ledge is preferably turned up angularly so that a protruding clamping edge 13 is formed.

The attachment flange 8 of the sealing strip profile has a corresponding longitudinal groove 19, into which the clamping edge 13 may engage (see FIG. 4). At the rear of the sliding roof panel 3 the clamping ledge 12 is continued as a rain gutter 14 (see FIG. 5). The clamping edge is there formed by a bead 13'.

On the longitudinal edges of the sliding roof panel 3 the seal has a similar construction (see FIG. 6). The transition of the seal from the transverse to the longitudinal edges takes place, as will be seen in FIG. 1, following the contour of rounded corners.

The underside of the sliding roof panel 3 is covered in the usual manner by a plate 16 carrying a ceiling fabric 15.

With the modification of the sliding roof panel 3 as illustrated in FIG. 7, the panel plate 3' and the stiffening frame 10' contact one another and are fixedly connected at the contact zone, say by welding or cementing. Said plate and frame have two oppositely directed turn ups 17, 18 which bound an insertion gap for the attachment flange 8', which latter is provided with longitudinal grooves 19 of the hollow sealing strip profile 6'.

As shown in FIG. 8 the sealing strip profile may alternatively have a lip-shaped sealing flange 6", by means of which advantageously major production tolerances can be bridged.

The sealing strip profile according to FIG. 9 consists in a resilient rail 20, which is coated with a layer of foam rubber 21 and is provided with pile fibres 22.

As shown in FIG. 10, the sealing profile may have a semi-circular hollow head 23, and the attachment flange 8" may have several longitudinal grooves 24, whereby a certain advantageous longitudinal stiffness is attained.

The sealing profile may finally be constructed according to FIGS. 11 and 12, its flange 8''' consisting of two halves 25, 25', extending in diametrically opposite directions (FIG. 11) which may be folded towards one another by pre-loading and clamped-in in this position (FIG. 12). In this embodiment the flange converges wedge-shaped, and is provided with grooves 19', which are located closely to the head 23' of the sealing strip.

Whatever modification is used, the arrangement of the sealing strip profile immediately below the sliding roof panel in conjunction with a corresponding converging attachment flange produces a smooth closure of the roof top surface since the enlarged head of the sealing profile extends upwardly up to the roof surface, where this head is well supported but owing to the turn up of the sliding roof panel not on a sharp edge, so that a good sealing pressure is reliably attained in use.

While we have described herein and illustrated in the accompanying drawings what may be considered typical and particularly useful embodiments of our said invention, we wish it to be understood, that we do not limit ourselves to the particular details and dimensions described and illustrated; for obvious modifications will occur to a person skilled in the art.

What we claim as our invention and desire to secure by Letters Patent, is:

1. An automobile roof having a thru opening, a rigid panel carried by said roof for back-and-forth movement between a closed position in circumferentially spaced relation within said roof opening and an open position below said roof rearward of said opening, an integral edge margin on said panel turned inward into spaced underlying relation with the adjacent portion of said panel and combining therewith to define a peripherally extending inwardly opening groove, a stiffening frame extending peripherally about the underside of said panel and having its outer edge portion firmly engaged in said groove, the inner region of said frame being stepped downward from said panel, a clamp ledge secured along the underside of said frame and extending outward in spaced relation beneath said inturned edge margin circumferentially therealong to define with the latter a peripherally extending outwardly opening groove, a sealing strip extending peripherally about the outer perimeter of said panel in engagement therewith and engageable with the inner perimeter of said opening in the closed position of said panel to seal the space about said panel within said opening, said strip including a hollow deformable head extending externally along said outwardly opening groove for sealing engagement with the inner perimeter of said opening, an attaching flange on said bead extending into and firmly secured within said outwardly opening groove, a roof-drain channel depending from the inner perimeter of said roof opening inwardly thereof and extending continuously along the front and sides of said opening, and a panel drain projecting rearwardly from the rearward portion of said clamp ledge extending laterally therealong and spanning the side portions of said roof-drain channels.

2. An automobile roof according to claim 1, said flange comprising a pair of complementary sections extending from said bead in diametrically opposite directions when unloaded and swung one upon the other for engagement in said outwardly opening groove.

3. An automobile roof according to claim 1, in combination with an upturned edge on said clamp ledge restricting the entry to said outwardly opening groove, and said flange being formed with a groove for receiving said upturned edge.

References Cited by the Examiner

UNITED STATES PATENTS

| | | | |
|---|---|---|---|
| 596,318 | 12/1897 | Blum | 20—69 |
| 847,553 | 3/1907 | Carter | 20—69 |
| 1,192,361 | 8/1916 | Wistrom | 20—69 |
| 1,998,791 | 4/1935 | Schanz | 20—69 |
| 2,122,712 | 7/1938 | Bishop | 296—137 |
| 2,208,712 | 7/1940 | Votypka | 296—137 |
| 2,345,273 | 3/1944 | Macklanburg | 20—69 |
| 2,550,323 | 4/1951 | Bishop | 296—137 |

FOREIGN PATENTS

| | | |
|---|---|---|
| 935,112 | 11/1955 | Germany. |
| 491,034 | 8/1938 | Great Britain. |
| 746,608 | 3/1956 | Great Britain. |

EARL J. WITMER, *Primary Examiner.*